United States Patent
Grimault et al.

(10) Patent No.: US 10,090,997 B2
(45) Date of Patent: Oct. 2, 2018

(54) METHOD FOR CHANGING AN AUTHENTICATION KEY

(71) Applicant: Orange, Paris (FR)

(72) Inventors: Jean Luc Grimault, Mondeville (FR); Said Gharout, Paris (FR)

(73) Assignee: ORANGE, Paris (FR)

(*) Notice: Subject to any disclaimer, the term of this patent is extended or adjusted under 35 U.S.C. 154(b) by 287 days.

(21) Appl. No.: 14/900,038

(22) PCT Filed: Jun. 27, 2014

(86) PCT No.: PCT/FR2014/051645
§ 371 (c)(1),
(2) Date: Dec. 18, 2015

(87) PCT Pub. No.: WO2014/207404
PCT Pub. Date: Dec. 31, 2014

(65) Prior Publication Data
US 2016/0164673 A1    Jun. 9, 2016

(30) Foreign Application Priority Data
Jun. 28, 2013   (FR) ..................................... 13 56264

(51) Int. Cl.
*H04L 9/00*    (2006.01)
*H04L 9/08*    (2006.01)
(Continued)

(52) U.S. Cl.
CPC .......... *H04L 9/0816* (2013.01); *H04L 9/0844* (2013.01); *H04L 9/0877* (2013.01);
(Continued)

(58) Field of Classification Search
CPC ... H04L 9/0816; H04L 9/0844; H04L 9/0877; H04L 63/0428
(Continued)

(56) References Cited

U.S. PATENT DOCUMENTS

| | | | |
|---|---|---|---|
| 6,321,079 B1* | 11/2001 | Cooper | ................. H04W 8/183 455/410 |
| 2005/0251680 A1 | 11/2005 | Brown et al. | |

(Continued)

FOREIGN PATENT DOCUMENTS

| | | |
|---|---|---|
| WO | 2006085207 A1 | 8/2006 |
| WO | 2006126077 A2 | 11/2006 |
| WO | 2009020281 A1 | 2/2009 |

OTHER PUBLICATIONS

The International Search Report for the PCT/FR2014/051645 application.

*Primary Examiner* — Aravind K Moorthy
*Assistant Examiner* — Peiliang Pan
(74) *Attorney, Agent, or Firm* — Haverstock & Owens LLP

(57) ABSTRACT

The invention relates to a method for generating an authentication key in a security module which stores a first root key (K_root_A) shared with a first network entity, the method including the following steps:
   sending a transfer request to a second network entity,
   receiving a first secret (S_b1) from the second network entity,
   generating a secret generation key (Kb1) from the first root key and from the first secret,
   receiving from the second network entity a second secret (S_b2) and an authentication message of the second secret calculated by means of the secret generation key transmitted to the second network entity by the first network entity,
   verifying the authentication message by means of the secret generation key,
   generating a second root key (K_root_B) if the verification is positive, said second root key being generated from the second secret (S_b2) and from the secret
(Continued)

generation key (Kb1), and used to generate an authentication key to access a network of the second network entity.

13 Claims, 3 Drawing Sheets

(51) Int. Cl.
  *H04W 12/04* (2009.01)
  *H04L 29/06* (2006.01)
(52) U.S. Cl.
  CPC ......... *H04L 63/0428* (2013.01); *H04W 12/04* (2013.01); *H04L 2209/127* (2013.01); *H04L 2209/24* (2013.01); *H04L 2209/80* (2013.01)
(58) Field of Classification Search
  USPC .......................................................... 380/44
  See application file for complete search history.

(56) References Cited

U.S. PATENT DOCUMENTS

| | | | |
|---|---|---|---|
| 2008/0298595 A1* | 12/2008 | Narayanan | H04L 63/06 380/278 |
| 2009/0240944 A1* | 9/2009 | Cho | H04L 63/068 713/175 |
| 2011/0078442 A1* | 3/2011 | Gong | H04L 63/0823 713/168 |
| 2013/0130676 A1* | 5/2013 | Manso | H04B 1/38 455/432.1 |
| 2013/0198130 A1* | 8/2013 | Resch | G06F 17/30106 707/609 |
| 2014/0087691 A1* | 3/2014 | Babbage | H04L 9/0869 455/411 |
| 2014/0122888 A1* | 5/2014 | Yoon | H04L 9/0844 713/171 |
| 2014/0287816 A1* | 9/2014 | Homer | G06F 7/588 463/22 |
| 2014/0359295 A1* | 12/2014 | Saif | H04W 12/04 713/173 |
| 2015/0038116 A1* | 2/2015 | Lodeweyckx | H04L 63/0853 455/411 |
| 2015/0089230 A1* | 3/2015 | Niset | H04L 9/0825 713/170 |
| 2015/0113278 A1* | 4/2015 | Cocchi | G06F 21/575 713/171 |

* cited by examiner

METHOD FOR CHANGING AN AUTHENTICATION KEY

The invention relates to the general field of telecommunications.

It relates more particularly to a method for generating an authentication key by a security module of a mobile device, said authentication key being intended to be used during an authentication between the security module and the network in order to access the network.

The invention is applied in the context of remote updates of protected data, such as secret keys, stored in a security module of a mobile device. An update of this type is required during a remote change of network operator. The invention can be applied to particularly good effect in fields such as those of mobile telephony or machine-to-machine communication (the term normally used is the term "M2M", from "Machine To Machine"). In these fields, mobile devices such as a mobile telephone or a machine equipped with sensors contain a UICC ("Universal Integrated Circuit Card") or "eUICC" (for "embedded") security module security module (the term normally used is "Secure Element"). One example of a security module of this type is a "(U)SIM" card (for "(Universal) Subscriber Identity Module") inserted into a device and used in mobile telephony. This (U)SIM card is preconfigured to function with a first network operator. For this purpose, keys specific to a manager of the module, for example the first network operator in the case of a (U)SIM card, and to the security module are pre-installed on the security module before it is commissioned. Thus, once the security module is put into service, the first network operator controls the card and is the sole entity able to install applications on the card, perform updates, authenticate the security module, etc.

When a subscriber of the first operator wishes to change operators, it is necessary to replace the security module in the device configured for the first operator with a second security module configured for the second operator, i.e. which includes keys specific to the second operator. Obviously, in the case of interconnected M2M devices using the network of the first operator to communicate with a remote central server, a change of operator requires a change of the security modules of all these devices, which therefore requires an on-site visit by a technician to perform this change. This is all the more restrictive given that the devices are often difficult to access. Furthermore, when the security modules are not movable, but are soldered to the device, a change of this type requires the replacement of the equipment.

Solutions exist for modifying authentication keys of operators on a (U)SIM card without changing the security module. For example, the international patent application of the applicant published under the number WO2011001076 describes a method for changing a first authentication key and a first subscriber identification number on a (U)SIM card, specific to a first network operator operating a first network, with a second authentication key and a second subscriber identification number, specific to a second network operator operating a second network. For this purpose, a key generation root key specific to the second network is stored on the card during a preconfiguration phase carried out before the card is commissioned. Thus, when the card is put into service to function in the first network and a request to change to the second operator is received, the second operator transmits a second subscriber identification number in the second network to the first operator. The first operator transmits the received second subscriber identification number and a random number to the (U)SIM card via its network, and also sends the random number to the second network operator. The card then generates a second authentication key by applying a key diversification algorithm to the random number and to the root key stored on the card and specific to the second network. For its part, the second operator calculates the same authentication key with the same root key specific to it and the random number received from the first network. The second operator stores the second authentication key in its subscriber database in association with the second subscriber identification number. At the end of the method, the first authentication key is replaced on the card with the second authentication key and the first subscriber identification number is replaced on the card with the second subscriber identification number. The (U)SIM card is thus ready to function in a second network.

It is thus possible to transfer the control of a security element from a first operator to a second operator once the security element has been put into service. This transfer may be effected without the subscriber changing security modules or intervening manually on this module.

However, this requires storage of the root keys specific to all the operators to which a transfer of the control of the card is likely to be effected. Furthermore, there are risks that the control of cards cannot be transferred to a new operator when the cards have been preconfigured prior to the arrival of this operator.

One of the objects of the invention is to remedy shortcomings/disadvantages of the prior art and/or make improvements in respect thereof.

To do this, the invention proposes a method for generating an authentication key in a security module, the security module 10 storing a first root key shared with a first network entity, the method including the following steps, implemented by the security module:

a step of sending a transfer request to a second network entity, a first step of the receiving of a first secret from the second entity, a step of generating a secret generation key from the first root key and from the first secret, a step of receiving from the second entity a second secret and an authentication message of the second secret calculated by the second entity by means of the secret generation key transmitted to the second entity by the first entity, a step of verifying the authentication message by means of the secret generation key, a step of generating a second root key if the verification is positive, said second root key being generated from the second secret and from the secret generation key, and used to generate an authentication key to access a network of the second network entity.

The method described enables the generation in a security module of a key intended to be used as an authentication key during the access to the network of the second entity by a mobile device which includes the security module. This key is therefore intended to be shared with the second entity. The key is generated remotely, without manual intervention on the security module, in particular without changing the security module included in the mobile device.

Furthermore, this generation does not require a prior installation in the security module of a root key of the second entity since this second root key is generated, on the one hand, by the security module from the second secret received in a secure manner from the second entity and from the secret generation key, and, on the other hand, by the second network entity. The secret generation key is generated, on the one hand, by the security module and, on the other hand, by the first network entity, which initially controlled the security module. This generation is effected from the first root key known to both the first entity and the security module, and from a first secret transmitted from the first entity to the security module. The secret generation key is transmitted in a secure manner from the first to the second entity. Through this transmission, which allows the second entity to generate the second root key, the first entity gives its authorization for the control of the security module to be transferred in due course from the first network entity to the second network entity. This transfer of control of the security module is effected by the generation of the second root key, from a second secret transmitted from the second entity to the security module and from the secret generation key, intended to be used to generate the authentication key to access the network of the second entity.

The second secret used by the security module and the second entity to generate the second root key is generated by the second entity and transmitted in a secure manner to the security module. Thus, the first entity never has access to this second secret, thereby strengthening the security of the method.

Similarly, the second root key intended to be used as an authentication key is never transmitted on the network since it is calculated, on the one hand, by the second entity and, on the other hand, by the security module. This avoids possible man-in-the-middle attacks in order to retrieve this key.

In one example embodiment, the generation of the authentication key consists of applying a key diversification algorithm to at least the second root key.

In this example embodiment, the second root key is used as a diversification key to generate a second authentication key by means of a diversification algorithm. The second root key can thus be used to generate a plurality of successive authentication keys. This is useful when the user of the mobile device regularly changes operators and returns, following a plurality of changes, to the operator corresponding to the second network entity. In fact, in this case, if care has been taken not to erase the second root key, the generation of a new second authentication key requires the sending by the second entity of a diversification label, but does not require either the transmission of the second secret used to generate the second root key or the regeneration of the second root key. The generation method is therefore simplified.

In another example embodiment, the step of generating the authentication key consists in applying the identity function to the second root key.

In one example embodiment, the first and the second secrets are received by the security module during a reception step with an authentication message of the two secrets.

Transmitting the first and the second secrets in the same message enables considerable time saving.

The invention also relates to a method for the generation of an authentication key by a first network entity, a generated authentication key being intended to be shared with a security module, said module storing a first root key shared with a second network entity, the method including the following steps, implemented by said first network entity:
 a step of receiving a transfer request from the security module,
 a step of sending a first secret to the security module,
 a step of sending the first secret to the second entity,
 a step of receiving from the second entity a secret generation key generated from the first root key and from the first secret,
 a step of sending a second secret and an authentication message of the second secret to the security module,
 a step of generating a second root key from the secret generation key and from the second secret, said second root key being used to generate an authentication key to access a network of the first entity.

The method described here allows the second entity itself to generate the second root key intended to be used as a second authentication key, without transmission of this key in the network.

The invention also relates to a security module suitable for generating a network authentication key, the security module including means to store a first root key shared with a first network entity, the security module furthermore including:
 sending means, configured to send a transfer request to a second network entity,
 first reception means, configured to receive a first secret from the second entity,
 first generation means, configured to generate a secret generation key from the first root key and from the first secret,
 second reception means, configured to receive from the second entity a second secret and an authentication message of the second secret calculated by the second entity by means of the secret generation key transmitted to the second entity by the first entity,
 verification means, configured to verify the authentication message by means of the secret generation key,
 second generation means, configured to generate a second root key from the second secret and from the secret generation key, said second root key being intended to be used to generate an authentication key to access a network of the second entity.

The invention also relates to a computer program intended to be installed in a memory of a security module, including instructions for implementing the steps of the method for generating an authentication key in a security module according to the invention when the program is executed by a processor.

The invention also relates to a data medium on which the above program is recorded.

The invention also relates to a mobile device including a security module according to the invention.

The invention also relates to a network entity suitable for generating a network authentication key intended to be shared with a security module, said security module storing a first root key shared with a first network entity, the network entity including:
 first reception means, configured to receive a transfer request from the security module,
 first sending means, configured to send a first secret to the security module,
 second sending means, configured to send the first secret to the first entity,
 second reception means, configured to receive from the first entity a secret generation key generated from the first root key and from the first secret,
 third sending means, configured to send a second secret and an authentication message of the second secret to the security module,
 generation means, configured to generate a second root key from the secret generation key and from the second secret, said second root key being intended to be used to generate an authentication key to access a network of the second entity.

The invention also relates to a computer program intended to be installed in a memory of a network entity, including instructions for implementing the steps of the method for the generation of an authentication key by a network entity according to the invention when the program is executed by a processor.

The invention also relates to a data medium on which the above program is recorded.

The invention also relates to a system for generating an authentication key, including:
- a security module according to the invention,
- a first network entity, including:
  - means for receiving the first secret from a second network entity according to the invention,
  - generation means, configured to generate the secret generation key from the first root key and from the first secret,
  - sending means, configured to send the secret generation key to the second entity,
- the second entity according to the invention.

Other characteristics and advantages of the present invention will be better understood from the description and attached drawings, in which.

Figure 1:
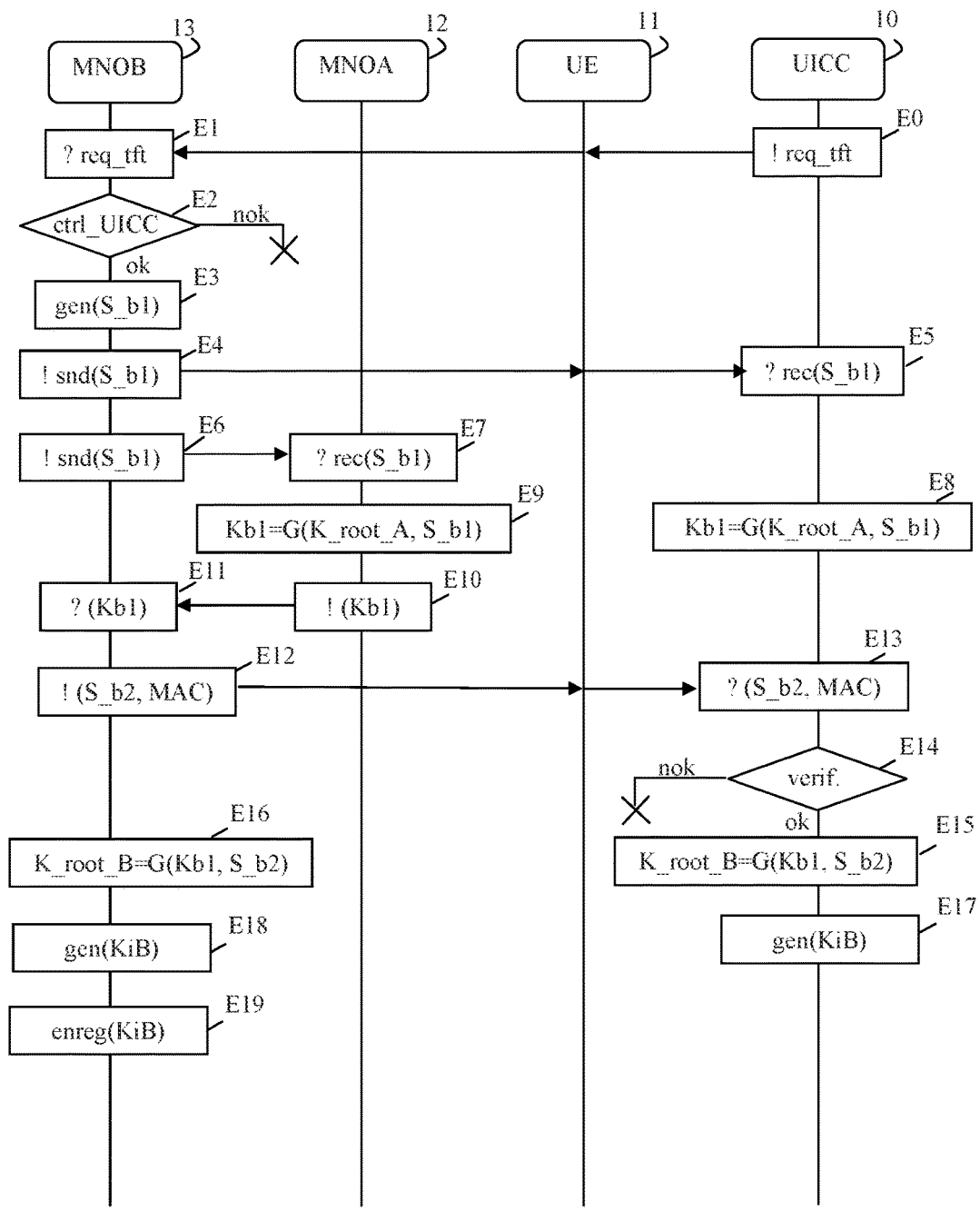
FIG. 1 shows the steps of a method for changing a network authentication key, according to a first example embodiment.

The steps of a method for changing authentication keys in a telecommunications network according to a first example embodiment will now be described in relation to FIG. 1.

A UICC ("Universal Integrated Circuit Card") or "eUICC" (for "embedded") security module 10 is included in a mobile device 11. One example of a module of this type is a "(U)SIM" card (for "(Universal) Subscriber Identity Module"), inserted into a device and used in mobile telephony to access a mobile network. The mobile device 11 is, for example, a mobile terminal or an "M2M" device ("Machine to Machine"). The security module 10 stores a profile which includes a network authentication secret key specific to a network operator and allowing the mobile device 11 to authenticate itself to the network during access to the network.

It is assumed that, in an initial configuration, the mobile device 11, more precisely the security module 10 of the device 11, stores a first profile A, including a first network authentication key KiA allowing the mobile device 11 to access the network of a first mobile operator denoted MNOA. The security module 10 furthermore stores a first secret key denoted K_root_A which it shares with the first operator MNOA. In one example embodiment, the first root key was installed by the first operator MNOA before the security module 10 was put into service. The first root key K_root_A is therefore known only to the first operator MNOA and to the security module 10. The security module 10 also stores a pair of public/private encryption keys Kpc/Ksc, intended to be used in encryption operations. The security module 10 optionally stores a pair of public/private signature keys Kps/Kss, intended for signature operations.

In the initial configuration, the security module 10 is therefore suitable for accessing the network of the first operator MNOA by means of a first active profile which includes the first network authentication key KiA.

In an initial step E0, a user, owner of the mobile device 10, wishes to change mobile network operators. He wishes that the mobile device 11 will in future access the network of a second mobile operator, denoted MNOB. For this purpose, a transfer request is sent by the security module 10 to the second operator MNOB via the first network A of the first operator MNOA. The transfer request includes a certificate of the public encryption key Kpc of the security module 10. The certificate includes information specific to the security module 10, including the public encryption key Kpc and an identifier of the security module 10, such as a serial number, or "ICCID" ("Integrated Circuit Card identifier"). Conventionally, the data of the certificate are signed by a Certification Authority. In one example embodiment, the transfer request is signed by the security module 10 by means of the secret signature key Kss stored in the security module 10. The signature operation is intended to prove to the second operator MNOB that the request does in fact originate from the security module 10. In fact, if the security module 10 is deemed to be trusted, the same does not apply to the mobile device 11. For example, in a case where the mobile device 11 is an intelligent smartphone terminal capable of accommodating a large quantity of software programs, it is known that viruses and spy software programs could potentially be installed on the terminal without the knowledge of the legitimate user, allowing a malicious individual to take control of the mobile device 11. A request could therefore be sent fraudulently by a different security module or by a different mobile device, instead of the security module 10.

The request is sent by radio and benefits from the security inherent in a radiotransmission. Alternatively, it is sent in data mode via the Internet network.

The transfer request is received by the second operator MNOB during a reception step E1.

In a control step E2, the second operator MNOB verifies that the security module 10 is associated with a legitimate security module. For this purpose, the second operator MNOB verifies the certificate of the public encryption key Kpc of the security module 10 received in the transfer request. For example, it verifies the signature of the certificate by means of a public key of the Certification Authority. In another example embodiment, it furthermore sends a request to the first operator MNOA in order to verify that the identifier of the security module 10 which appears in the certificate is indeed the identifier of a security module registered with the first operator MNOA. If the request is signed by means of the secret signature key Kss, the second operator MNOB verifies the signature by means of the public signature key Kps. In one example embodiment, the public signature key Kps is in the possession of the second operator MNOB. In another embodiment, the public signature key Kps can be accessed by the second operator MNOB by means of a public directory.

If the control carried out in step 2 is positive ("ok" in FIG. 1), in a following step E3 of generating a secret, the second operator MNOB generates a first secret S_b1. The first secret S_b1 is a series of bits generated, for example, by means of a pseudo-random generator. The first secret S_b1 is then encrypted by the second operator MNOB for the attention of the security module 10 by means of the public encryption key Kpc associated with the security module 10. If the control carried out during step E2 is negative (branch "nok" in FIG. 1), the method stops. In fact, in this case, the request received by the second operator MNOB does not originate from a valid security module.

In a first step E4 of sending the secret, the second operator MNOB sends the encrypted first secret S_b1 to the security module 10 via the mobile device 11. The encrypted first secret S_b1 is received by the security module 10 in a reception step E5.

In a second step E6 of sending the secret, the second operator MNOB sends the first secret S_b1 to the first operator MNOA. The first secret S_b1 is transmitted to the first operator MNOA in a secure manner according to known methods. For example, a dedicated link is set up between the second and the first operator MNOB, MNOA. In another example embodiment, the first secret S_b1 is encrypted by means of a public key of the first operator MNOA. In a third example, the first secret S_b1 is encrypted by means of a symmetric algorithm by means of a secret key shared between the second and the first operator MNOB, MNOA. The first secret S_b1 is received by the first operator MNOA during a reception step E7.

In a decryption and generation step E8, the security module 10 decrypts the received encrypted first secret S_b1 by means of its secret decryption key Ksc. The security module 10 then generates a secret generation key Kb1 by means of the first secret S_b1 and the first root key K_root_A. A key diversification algorithm "KDF" ("Key Derivation Function") can be used. The secret generation key can thus be obtained by means of the diversification algorithm G parameterized by the first root key K_root_A and by the first secret Sb1, according to the following formula: Kb1=G(S_b1, K_root_a). The key diversification algorithm KDF concept is known to the person skilled in the art and is not described here.

In a step E9 of generation by the first operator, the first operator MNOA generates the secret generation key Kb1 in the same way as the security module 10 during the preceding step E8. The first operator MNOA has the root key K_root_A and has received the first secret S_b1 from the second operator MNOB during the secret-sending step E6. It generates the secret generation key Kb1 by applying the same key diversification algorithm G to the first secret S_b1 and to the root key K_root_A.

In a step E10 of transmission to the second operator, the first operator MNOA transmits the secret generation key Kb1 to the second operator MNOB in a secure manner. By means of this transmission, the first operator MNOA implicitly gives an authorization for a profile specific to the second operator MNOB to be installed and activated on the security module 10. The transmission can be secured by any known security method based on public key cryptography or secret key cryptography. The secret generation key Kb1 is received by the second operator MNOB in a reception step E11.

In a generation and sending step E12, the second operator MNOB generates a second secret S_b2. It sends it encrypted with the public encryption key Kpc to the security module 10 via the mobile device 1 with an authentication message or "MAC" (for "Message Authentication Code") generated by means of the secret generation key Kb1. The authentication message MAC is intended to ensure the integrity of the transmitted data, in this case the encrypted second secret S_b2, and to allow the security module 10 to ensure that the second operator MNOB is authorized by the first operator MNOA to generate a root key for it. In fact, the security module 10 has knowledge of the secret generation key Kb1 which it has received from the first operator MNOA during step E10 and the authentication message MAC requires the secret generation key Kb1 transmitted from the first to the second operator MNOA, MNOB. This transmission is carried out via the network of the first operator MNOA. The encrypted second secret S_b2 and the authentication message MAC are received by the security module 10 in a reception step E13.

In a verification step E14, the security module 10 verifies the authentication message MAC by means of the secret generation key Kb1. If the verification of the authentication message MAC is positive, this means that the secret S_b2 transmitted during step E12 has not been modified and that the first operator has sent the secret generation key Kb1 to the second operator MNOB. This means that the first operator MNOA has given its authorization for the security module 10 to generate a second root key specific to the second operator MNOB.

In the case where the verification is positive (branch "ok" in FIG. 1), the security module 10, in a step E15 of generating a second root key, generates a second root key K_root_B by means of the second secret S_b2 and the secret generation key Kb1. The second root key K_root_B can be generated by means of the key diversification algorithm G parameterized by the second secret S_b2 and the secret generation key Kb1. When the verification implemented during step E14 is negative (branch "nok" in FIG. 1), the method stops. In fact, in this case, the second secret S_b2 has been corrupted during the sending in step E12 or the first operator MNOA has not given its authorization for the security module to generate the second root key K_root_B specific to the second operator MNOB.

In a step E16 of generating the second root key, the second operator MNOB generates the second root key K_root_B in the same way as the security module 10 during the preceding step.

In a step E17 of generating a second network key, the security module 10 generates a second network authentication key KiB by means of the second root key K_root_B. To do this, it applies the key diversification algorithm G to the second root key K_root_B and to a label received from the second operator MNOB, for example during step E12. The label is a diversification datum used by the diversification algorithm G to generate different keys from the same secret root key. The label is a datum received from the second operator MNOB, for example during step E12 of sending a new secret. The label may be a datum incremented by the second operator MNOB with each new network key generation, or a datum such as a current date, etc. The second network authentication key KiB is intended to access the network of the second operator MNOB.

In a step E18 of generating the second network key, the second operator MNOB generates the second network authentication key KiB in the same way as the security module 10 during step E17.

At this stage, the security module and the second operator MNOB share the second network authentication key KiB.

In a registration step E19, the second operator MNOB generates a unique subscriber identifier IMSIB in the network of the second operator MNOB for the security module 10. This unique identifier is better known by the acronym "IMSI" ("International Mobile Subscriber Identifier"). The second operator MNOB transmits this identifier IMSIB to the security module 10 and registers the second network authentication key KiB in an authentication center in association with the identifier IMSIB. The security module 10 registers the unique identifier IMSIB received from the second operator MNOB in association with the second network authentication key KiB.

At this stage, the mobile device 11 is able to access the mobile network of the second operator MNOB. Either the mobile device 11 is reinitialized by being switched off then switched back on, or a command to refresh the data of the profile is sent by the security module 10 to the mobile device 11. This command, referred to as REFRESH, is intended to inform the mobile device 11 of changes that have taken place in the security module 10.

In one example embodiment, the second network access key KiB replaces the first network access key KiA and the second root key K_root_B replaces the first root key K_root_A in a memory of the security module 10. In another example embodiment, the first root key K_root_A and the first network access key KiA are stored in a secure area of the security module 10. Thus, if the owner of the mobile device 11 wishes to return to the first operator MNOA, all or some of these keys can be reused.

In the example embodiment described here, the key diversification algorithm G is applied to the second root key K_root_B in order to generate the second authentication key KiB. In another example embodiment, the identity function Id( ) is applied to the second root key K_root_B in order to generate the second authentication key. The identity function uses a datum as its argument and returns the same datum. In other words Id(K_root_B)=K_root_B. In this example, it is therefore the second root key K_root_B that is used as the second authentication key. In other words, KiB=K_root_B. However, the use of a key diversification algorithm is advantageous when it is necessary to generate a plurality of successive authentication keys. Thus, if the user of the mobile device 11 regularly changes operators and returns to the second operator MNOB, a new network authentication key specific to the second operator MNOB can be generated more easily, provided that the second root key K_root_B is still stored in the security module 10. In fact, in this case, the second operator MNOB sends a new label intended to diversify the generation of the new authentication key from the second root key K_root_B.

In the example described here, the change of authentication key is implemented between a first operator MNOA and a second operator MNOB. In the initial configuration, the security module 10 includes an active profile with the first operator MNOA. This means that:

the security module 10 was put into service with the first authentication key KiA. The mobile device 11 is then able to access the network of the first operator MNOA and, during this access, the security module 10 authenticates itself to the network of the first operator MNOA by means of the first authentication key, or the first root key K_root_A was installed by following the previously described method on the basis of an old, previously installed root key.

The invention is not limited to this example. Thus, in another example embodiment (not shown in FIG. 1), the security module 10 has not yet been put into service. The method according to the invention is suitable for installing an active profile in the security module 10, corresponding to a first subscription with a third operator MNOC. In this case, the security module 10 stores an initialization root key K_root_init, known to the security module 10 and to a card embedder (not shown). It also stores an initialization authentication key Kiinit, intended to access an initialization operator network MNOInit for a first time for the purpose of initial installation only. The previously described method applies. In this case, a first entity which corresponds to the card embedder carries out the steps of the method as previously described which are implemented by the first operator MNOA. A second entity which corresponds to the third operator MNOC carries out the steps as previously described which are implemented by the second operator MNOB. In this example embodiment, the transfer request sent by the security module 10 to the second entity, the sending of the second secret S_b2 by the second entity to the security module 10, when they are transmitted wirelessly, then use the mobile network of the initialization operator MNOInit.

It should be noted that, if certain public key cryptography mechanisms are used, for example during the initial step E0 for the transmission of the transfer request and in order to verify the origin of the request, it is not necessary to deploy a public key infrastructure. In fact, the certificate is used in order to verify certain data associated with a security module, such as an identifier. It is not necessary to manage revocations of identifiers ICCID of security modules. In fact, a security module that was revoked could not access the network of the first operator since it would not be authenticated. The deployment of a public key infrastructure of this type in a mobile network would in any event be impossible to envisage.

Obviously, the previously described method is also applied in a case where the first authentication key KiA was installed by following the steps of the described method. The method is therefore applied to updates of authentication keys.

Figure 2:
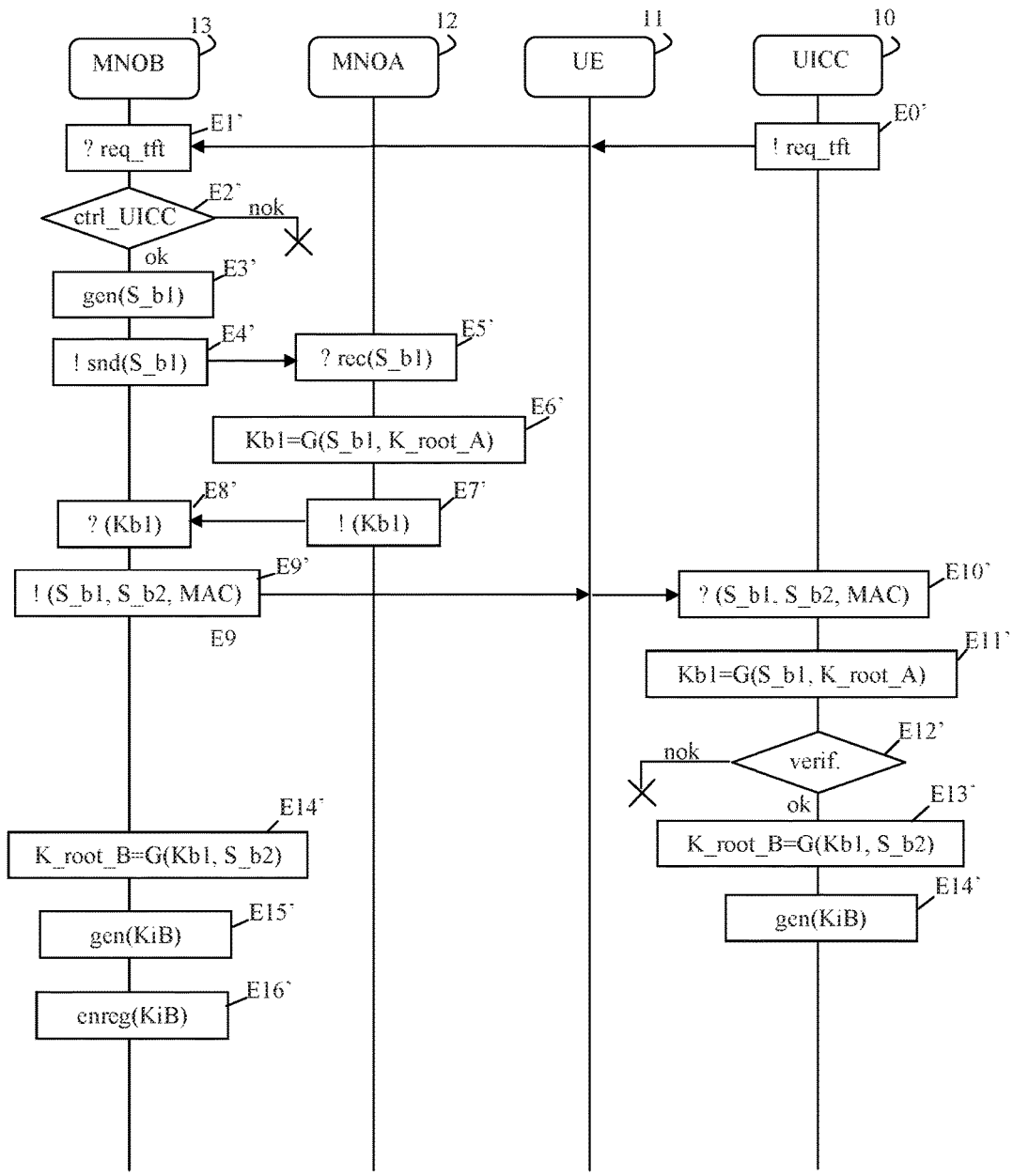
FIG. 2 shows the steps of a method for changing a network authentication key, according to a second example embodiment.

The steps of a method for generating an authentication key in a telecommunications network according to a second example embodiment will now be described in relation to FIG. 2.

It is assumed that, in an initial configuration similar to the initial configuration described in relation to FIG. 1, the mobile device 11, more precisely the security module 10 of the device 11, stores a first profile A, including a first network authentication key KiA allowing the mobile device 11 to access the network of the first operator MNOA. The security module 10 furthermore stores the first root key denoted K_root_A installed by the first operator MNOA before the security module 10 is put into service. The security module 10 also stores a pair of public/private encryption keys Kpc/Ksc and optionally a pair of public/private signature keys Kps/Kss, intended for signature operations.

In the initial configuration, the security module 10 is therefore suitable for accessing the network of the first operator MNOA by means of the first active profile which includes the first network authentication key KiA.

In an initial step E0', comparable to the initial step E0 previously described, the user, owner of the mobile equipment 10, wishes to change mobile network operators. He wishes that the mobile device 11 will in future access the network of the second mobile operator MNOB. For this purpose, a transfer request is sent by the security module 10 to the second operator MNOB via the first network A of the first operator MNOA. The transfer request includes the certificate of the public encryption key Kpc of the security module 10. In one example embodiment, the transfer request is signed by the security module 10 by means of the secret signature key Kss stored in the security module 10.

The request can be sent wirelessly and benefits from the security inherent in a radiotransmission. Alternatively, it is sent in data mode via the Internet network.

The transfer request is received by the second operator MNOB during a reception step E1.

In a control step E2', comparable to step E2 previously described, the second operator MNOB verifies that the security module 10 is associated with a legitimate security module. For this purpose, the second operator MNOB verifies the certificate of the public encryption key Kpc of the security module 10 received in the transfer request. If the request is signed by means of the secret signature key Kss, the second operator MNOB verifies the signature by means of the public signature key Kps.

In a following step E3' of generating a secret, comparable to step E3 previously described, the second operator MNOB generates the first secret S_b1.

In a first step E4' of sending the secret, comparable to step E6 previously described, the second operator MNOB sends the first secret S_b1 to the first operator MNOA in a secure manner, according to a known method. The first secret S_b1 is received by the security module 10 in a reception step E5'.

In a step E6' of generation by the first operator, comparable to step E9 previously described, the first operator MNOA generates the secret generation key Kb1 by means of the first secret S_b1 and the root key K_root_A. The KDF key diversification algorithm G can be used.

In a step E7' of transmission to the second operator, comparable to step E10 previously described, the first operator MNOA transmits the first secret generation key Kb1 to the second operator MNOB in a secure manner. Through this transmission, the first operator MNOA implicitly gives an authorization for a profile specific to the second operator MNOB to be installed and activated on the security module 10. The secret generation key Kb1 is received by the second operator MNOB in a reception step E8'.

In a secret-sending step E9', the second operator MNOB sends to the security module 10, via the mobile device 11, the first secret S_b1 and a second secret S_b2, encrypted with the public encryption key Kpc of the security module 10, and also an authentication message MAC, generated by means of the first secret generation key Kb1. The authentication message MAC is intended to ensure the integrity of the transmitted data and to authenticate the second operator MNOB and allow the security module 10 to ensure that the second operator MNOB is authorized by the first operator MNOA to generate a root key for it.

This transmission is carried out via the network of the first operator MNOA. It should be noted that, in this variant, the first and the second secrets S_b1, S_b2 are transmitted to the security module 10 in the same message. This constitutes an optimization in terms of time. The encrypted first secret S_b1, the encrypted second secret S_b2 and the authentication message MAC are received by the security module 10 in a reception step E10'.

In a step E11' of generating the secret generation key Kb1, the security module 10 generates the secret generation key Kb1 by means of the first secret S_b1 and the first root key K_root_A, in the same way as the first operator MNOA during step E6'. The security module 10 applies the key diversification algorithm G to the first root key K_root_A and to the first secret generation key Kb1.

In a verification step E12', comparable to step E14 previously described, the security module 10 verifies the authentication message MAC by means of the secret generation key Kb1. If the authorization verification is positive, this means that the first and the second secrets S_b1, S_b2 transmitted during step E9' have not been modified and that the first operator MNOA has sent the secret generation key to Kb1 the second operator MNOB. This means that the first operator MNOA has given its authorization for the security module 10 to generate a second root key specific to the second operator MNOB.

In the case where the verification is positive (branch "ok" in FIG. 1), the security module 10, in a step E13' of generating a second root key, comparable to step E15 previously described, generates a second root key K_root_B by means of the second secret S_b2 and the secret generation key Kb1. The second root key K_root_B can be generated by means of the key diversification algorithm G parameterized by the second secret S_b2 and the first secret generation key Kb1. When the verification implemented during step E13' is negative (branch "nok" in FIG. 1), the method stops. In fact, in this case, the sending of the secrets S_b1, S_b2 has been corrupted during the sending in the secret-sending step E9', or the first operator MNOA has not given its authorization for the security module to generate the second root key K_root_B specific to the second operator MNOB.

In a step E14' of generating a second network key, comparable to step E17 previously described, the security module 10 generates a second network authentication key KiB by means of the second root key K_root_B. To do this, it applies the key diversification algorithm G to the second root key K_root_B and to a label received from the second operator MNOB, for example during step E9'. The label may be a datum incremented by the second operator MNOB with each authentication key generation, or a datum such as the current date. It applies the key diversification algorithm G to these two data.

In a step E15' of generating the second root key, the second operator MNOB generates the second secret key K_root_B in the same way as the security module 10 during step E13'. It applies the key diversification algorithm to the second secret S_b2 and to the first secret generation key Kb1.

In a step E16' of generating the second network key, comparable to step E18 previously described, the second operator MNOB generates the second network authentication key KiB in the same way as the security module 10 during step E14'.

At this stage, the mobile device 11 is able to access the mobile network of the second operator MNOB. Either the mobile device 11 is reinitialized by being switched off then switched back on, or a command to refresh the data of the profile is sent by the security module 10 to the mobile device 11. This command, referred to as REFRESH, is intended to inform the mobile device 11 of changes that have taken place in the security module 10.

Obviously, this example embodiment also applies during the installation of a first profile associated with a first subscription with a third operator MNOC. The entities involved then being the card embedder which carries out the steps of the method implemented by a first entity, in this case the first operator MNOA, and a third operator MNOC which carries out the steps of the method implemented by a second entity, in this case the second operator MNOB.

Figure 3:
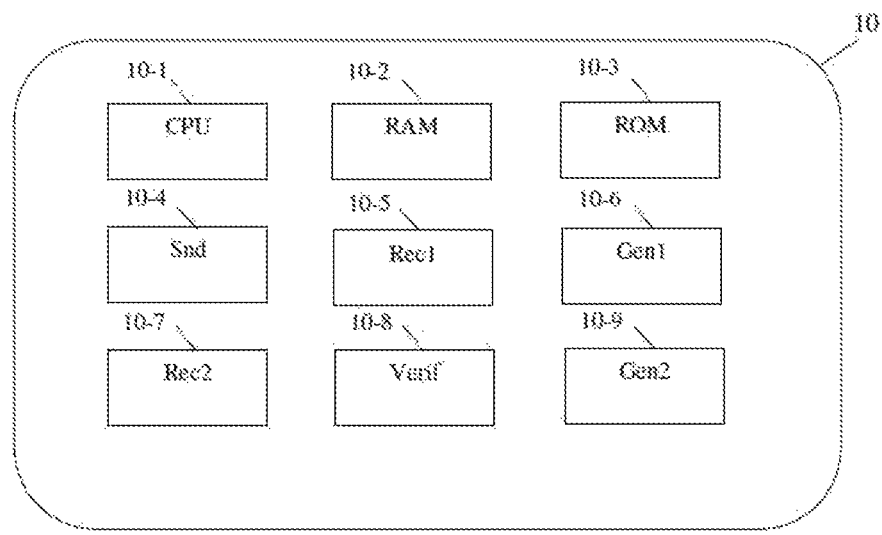
FIG. 3 is a schematic representation of a security module, according to one example embodiment of the invention.

A schematic representation of a security module 10 according to one example embodiment of the invention will now be described in relation to FIG. 3.

In the example embodiment described here, the security module 10 is a USIM or eUSIM subscriber identity card intended to be received in a mobile device (not shown in FIG. 3), for example a mobile terminal or an M2M device. The security module 10 includes:
  a processor 10-1 or "CPU" ("Central Processing Unit"), intended to load instructions into a memory, execute them and perform operations;
  a group of memories, including a volatile memory 10-2 or "RAM" ("Random Access Memory"), used to execute code instructions, store variables, etc., and a storage memory 10-3 or "EEPROM" ("Electrically Erasable Programmable Read Only Memory"). The storage memory 10-3 is configured to store an application including code instructions to implement the steps of the previously described method for generating an authentication key. The application is, for example, an applet which is downloadable and/or stored in the memory 10-3. The storage memory 10-3 is also configured to store at least one subscriber profile. The first profile includes at least one first authentication key KiA associated with a first subscriber identification number, the authentication key and the identification number being used to access a network of a first operator MNOA. The first profile may also include algorithms, "OTA" ("Over The Air") keys and, where appropriate, data specific to the network of the first operator. The storage memory 10-3 is also configured to store the first root key K_root_A of the first network entity. In one example embodiment, the first network entity is an operator MNOA. In this case, the security module 10 is already in service. In another example embodiment, the first entity is a card embedder. In this case, this involves putting the security module 10 into service and installing a first profile in order to access an operator network. When the first entity is a card embedder, the storage memory 10-3 contains an initialization root key K_root_init and an initialization authentication key Kiinit intended to access an initialization operator network MNOInit for a first time.

A part of the profile may also be included in the mobile device which houses the security module 10.

The security module 10 also includes:

sending means 10-4, configured to send a transfer request to a second network entity, for example the second operator MNOB, first reception means 10-5, configured to receive a first secret S_b1 from the second entity, first generation means 10-6, configured to generate a secret generation key Kb1 from the first root key K_root_A and from the first secret S_b1, second reception means 10-7, configured to receive from the second entity a second secret S_b2 and an authentication message of the second secret calculated by means of the secret generation key transmitted to the second entity by the first operator, verification means 10-8, configured to verify the authentication message by means of the generation key, second generation means 10-9, configured to generate a second root key K_root_B from the second secret S_b2 and from the secret generation key Kb1, said second root key being intended to be used to generate the second authentication key to access a network of the second entity.

The sending means 10-4, the first reception means 10-5, the first generation means 10-6, the second reception means 10-7, the verification means 10-8 and the second generation means 10-9 are preferably software modules including software instructions instigating the execution of the steps of the method for generating an authentication key in a security module as previously described.

The invention therefore also relates to:

a program on a data support, loadable into the internal memory of the security module, the program including code instructions for implementing the steps of the method for generating an authentication key as previously described, when the program is executed by said module;

a data medium on which the program according to the invention is recorded.

The invention also relates to a mobile device which includes a security module as previously described.

Figure 4:
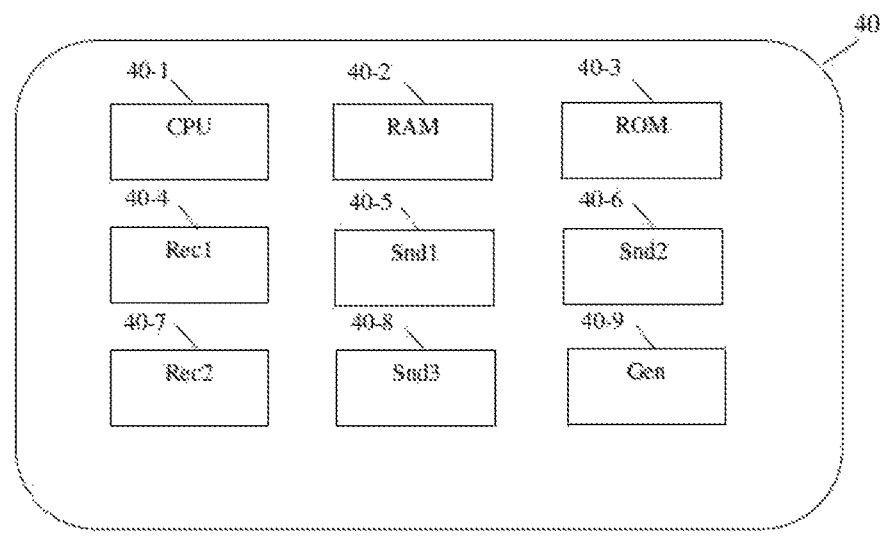
FIG. 4 is a schematic representation of a network entity, according to one example embodiment of the invention.

A schematic representation of a network entity 40 according to one example embodiment of the invention will now be described in relation to FIG. 4.

The network entity 40 is a technical entity which implements the steps of the method previously described which are carried out by the second operator MNOB. It is a computing device, such as a server, suitable for communicating with the first operator MNOA, more precisely with a first network entity, managed by the first operator and implementing the steps of the previously described method which are carried out by the first operator MNOA.

The network entity 40 includes:

a processor 40-1, intended to load instructions into a memory, execute them and perform operations;

a group of memories, including a volatile memory 40-2 or "RAM" ("Random Access Memory"), used to execute code instructions, store variables, etc., and a storage memory 40-3 or "EEPROM" ("Electrically Erasable Programmable Read Only Memory"). The storage memory 40-3 is configured to store an application including code instructions to implement the steps of the previously described method for the generation of an authentication key by a network entity. The storage memory 40-3 is also configured to store data associating an authentication key with a unique subscriber identifier in the network of the second operator MNOB. Generally speaking, these data are stored remotely in a dedicated authentication server.

The network entity 40 also includes:

first reception means 40-4, configured to receive a transfer request from the security module (not shown), first sending means 40-5, configured to send a first secret S_b1 to the security module, second sending means 40-6, configured to send the first secret to the first network entity, second reception means 40-7, configured to receive from the first entity a secret generation key Kb1, generated from the first root key and from the first secret, third sending means 40-8, configured to send to the security module a second secret S_b2 and an authentication message of the second secret, second generation means 40-9, configured to generate a second root key K_root_B from the secret generation key and from the second secret, said second root key being intended to be used to generate an authentication key to access a network of the entity.

The reception means 40-4, the first sending means 40-5, the second sending means 40-6, the second reception means 40-7, the third sending means 40-8, the second generation means 40-9 are preferably software modules including software instructions instigating the execution of the steps of the method for generating an authentication key in a network entity as previously described.

The invention therefore also relates to:

a program on a data support, loadable into the internal memory of the network entity, the program including code instructions for implementing the steps of the method for generating an authentication key as previously described, when the program is executed by said entity;

a data medium on which the program presented above is recorded.

The invention also relates to a system including a mobile device equipped with a security module 10 as previously described, a network entity 40 as previously described and a first network entity which implements the steps of the previously described method which are carried out by the first operator MNOA. This first network entity includes:
- means for receiving the first secret from the network entity 40 as previously described,
- generation means, configured to generate the secret generation key Kb1 from the first root key and from the first secret,
- sending means, configured to send the secret generation key to the network entity 40.

The invention claimed is:

1. A method for generating an authentication key in a security module, the security module storing a first root key (K_root_A) shared with a first network entity, the method including the following steps, implemented by the security module:
- a step of sending a transfer request to a second network entity,
- a step of receiving a first secret (S_b1) from the second network entity,
- a step of generating a secret generation key (Kb1) from the first root key and from the first secret,
- a step of receiving from the second network entity a second secret (S_b2) and a message authentication code of the second secret generated by the second network entity by means of the secret generation key (Kb1) transmitted to the second network entity by the first network entity,
- a step of verifying the message authentication code by means of the secret generation key (Kb1),
- a step of generating a second root key (K_root_B) when the verification is positive, said second root key being generated from the second secret (S_b2) and from the secret generation key (Kb1), and used to generate an authentication key to access a network of the second network entity.

2. The method as claimed in claim 1, in which the generation of the authentication key consists in applying a key diversification algorithm to at least the second root key.

3. The method as claimed in claim 1, in which the step of generating the authentication key consists in applying the identity function to the second root key.

4. The method as claimed in claim 1, in which the first and the second secrets (S_b1, S_b2) are received by the security module during the same reception step with the message authentication code of the two secrets.

5. A method for the generation of an authentication key by a first network entity, a generated authentication key being intended to be shared with a security module, said module storing a first root key (K_root_A) shared with a second network entity, the method including the following steps, implemented by said first network entity:
- a step of receiving a transfer request from the security module,
- a step of sending a first secret (S_b1) to the security module,
- a step of sending the first secret to the second network entity,
- a step of receiving from the second network entity a secret generation key (Kb1) generated from the first root key and from the first secret,
- a step of sending a second secret (S_b2) and a message authentication code of the second secret to the security module, wherein the message authentication code is generated using the secret generation key (Kb1),
- a step of generating a second root key from the secret generation key (Kb1) and from the second secret, said second root key being used to generate an authentication key to access a network of the first network entity.

6. A security module suitable for generating a network authentication key, the security module including means to store a first root key (K_root_A) shared with a first network entity, the security module furthermore including:
- sending means, configured to send a transfer request to a second network entity,
- first reception means, configured to receive a first secret (S_b1) from the second network entity,
- first generation means, configured to generate a secret generation key (Kb1) from the first root key and from the first secret,
- second reception means, configured to receive from the second network entity a second secret (S_b2) and a message authentication code of the second secret generated by the second network entity by means of the secret generation key (Kb1) transmitted to the second network entity by the first network entity,
- verification means, configured to verify the message authentication code by means of the secret generation key (Kb1),
- second generation means, configured to generate a second root key (K_root_B) from the second secret (S_b2) and from the secret generation key (Kb1), said second root key being intended to be used to generate an authentication key to access a network of the second network entity.

7. A computer program installed in a memory of a security module, including instructions for implementing steps of a method for generating an authentication key in a security module, when the program is executed by a processor, the method for generating an authentication key in a security module, the security module storing a first root key (K_root_A) shared with a first network entity, the method including the following steps, implemented by the security module:
- a step of sending a transfer request to a second network entity,
- a step of receiving a first secret (S_b1) from the second network entity,
- a step of generating a secret generation key (Kb1) from the first root key and from the first secret,
- a step of receiving from the second network entity a second secret (S_b2) and a message authentication code of the second secret generated by the second network entity by means of the secret generation key (Kb1) transmitted to the second network entity by the first network entity,
- a step of verifying the message authentication code by means of the secret generation key (Kb1),
- a step of generating a second root key (K_root_B) when the verification is positive, said second root key being generated from the second secret (S_b2) and from the secret generation key (Kb1), and used to generate an authentication key to access a network of the second network entity.

8. A non-transitory data medium on which a program is recorded, the program including instructions for implementing steps of a method for generating an authentication key in a security module, when the program is executed by a processor, the method for generating an authentication key in a security module, the security module storing a first root key (K_root_A) shared with a first network entity, the method including the following steps, implemented by the security module:

a step of sending a transfer request to a second network entity, a step of receiving a first secret (S_b1) from the second network entity, a step of generating a secret generation key (Kb1) from the first root key and from the first secret, a step of receiving from the second network entity a second secret (S_b2) and a message authentication code of the second secret generated by the second network entity by means of the secret generation key (Kb1) transmitted to the second network entity by the first network entity, a step of verifying the message authentication code by means of the secret generation key (Kb1), a step of generating a second root key (K_root_B) when the verification is positive, said second root key being generated from the second secret (S_b2) and from the secret generation key (Kb1), and used to generate an authentication key to access a network of the second network entity.

9. A mobile device including a security module suitable for generating a network authentication key, the security module including means to store a first root key (K_root_A) shared with a first network entity, the security module furthermore including:

sending means, configured to send a transfer request to a second network entity, first reception means, configured to receive a first secret (S_b1) from the second network entity, first generation means, configured to generate a secret generation key (Kb1) from the first root key and from the first secret, second reception means, configured to receive from the second network entity a second secret (S_b2) and a message authentication code of the second secret generated by the second network entity by means of the secret generation key (Kb1) transmitted to the second network entity by the first network entity, verification means, configured to verify the message authentication code by means of the secret generation key (Kb1), second generation means, configured to generate a second root key from the second secret (S_b2) and from the secret generation key (Kb1), said second root key being intended to be used to generate an authentication key to access a network of the second network entity.

10. A network entity suitable for generating a network authentication key intended to be shared with a security module, said security module storing a first root key (K_root_A) shared with a first network entity, the network entity including:

first reception means, configured to receive a transfer request from the security module, first sending means, configured to send a first secret (S_b1) to the security module, second sending means, configured to send the first secret to the first network entity, second reception means, configured to receive from the first network entity a secret generation key (Kb1), generated from the first root key and from the first secret, third sending means, configured to send to the security module a second secret (S_b2) and a message authentication code of the second secret, wherein the message authentication code is generated using the secret generation key (Kb1), generation means, configured to generate a second root key (K_root_B) from the secret generation key (Kb1) and from the second secret, said second root key being intended to be used to generate an authentication key to access a network of the second network entity.

11. A computer program installed in a memory of a network entity, including instructions for implementing steps of a method for generation of an authentication key by a first network entity, when the program is executed by a processor, a generated authentication key being intended to be shared with a security module, said module storing a first root key (K_root_A) shared with a second network entity, the method including the following steps, implemented by said first network entity:

a step of receiving a transfer request from the security module, a step of sending a first secret (S_b1) to the security module, a step of sending the first secret to the second network entity, a step of receiving from the second network entity a secret generation key (Kb1) generated from the first root key and from the first secret, a step of sending a second secret (S_b2) and a message authentication code of the second secret to the security module, wherein the message authentication code is generated using the secret generation key (Kb1), a step of generating a second root key from the secret generation key (Kb1) and from the second secret, said second root key being used to generate an authentication key to access a network of the first network entity.

12. A non-transitory data medium on which a program is recorded, the program including instructions for implementing steps of a method for generation of an authentication key by a first network entity, when the program is executed by a processor, a generated authentication key being intended to be shared with a security module, said module storing a first root key (K_root_A) shared with a second network entity, the method including the following steps, implemented by said first network entity:

a step of receiving a transfer request from the security module, a step of sending a first secret (S_b1) to the security module, a step of sending the first secret to the second network entity, a step of receiving from the second network entity a secret generation key (Kb1) generated from the first root key and from the first secret, a step of sending a second secret (S_b2) and a message authentication code of the second secret to the security module, wherein the message authentication code is generated using the secret generation key (Kb1), a step of generating a second root key from the secret generation key (Kb1) and from the second secret, said second root key being used to generate an authentication key to access a network of the first network entity.

13. A system for generating an authentication key, including:

a security module suitable for generating a network authentication key, the security module including means to store a first root key (K_root_A) shared with a first network entity, the security module furthermore including:

sending means, configured to send a transfer request to a second network entity, first reception means, configured to receive a first secret (S_b1) from the second network entity, first generation means, configured to generate a secret generation key (Kb1) from the first root key and from the first secret, second reception means, configured to receive from the second network entity a second secret (S_b2) and a message authentication code of the second secret generated by the second network entity by means of the secret generation key (Kb1) transmitted to the second network entity by the first network entity, verification means, configured to verify the message authentication code by means of the secret generation key (Kb1), second generation means, configured to generate a second root key (K_root_B) from the second secret (S_b2) and from the secret generation key (Kb1), said second root key being intended to be used to generate an authentication key to access a network of the second network entity, the first network entity, including:

means for receiving the first secret from a second network entity, generation means, configured to generate the secret generation key (Kb1) from the first root key and from the first secret, sending means, configured to send the secret generation key (Kb1) to the second network entity, the second network entity suitable for generating a network authentication key intended to be shared with a security module, said security module storing a first root key (K_root_A) shared with a first network entity, the network entity including:

first reception means, configured to receive a transfer request from the security module, first sending means, configured to send a first secret (S_b1) to the security module, second sending means, configured to send the first secret to the first network entity, second reception means, configured to receive from the first network entity a secret generation key (Kb1), generated from the first root key and from the first secret, third sending means, configured to send to the security module a second secret (S_b2) and a message authentication code of the second secret, generation means, configured to generate a second root key (K_root_B) from the secret generation key (Kb1) and from the second secret, said second root key being intended to be used to generate an authentication key to access a network of the second network entity.

* * * * *